(12) United States Patent
Oliner et al.

(10) Patent No.: US 11,809,417 B2
(45) Date of Patent: Nov. 7, 2023

(54) APPARATUS AND METHOD FOR TRANSFORMING UNSTRUCTURED DATA SOURCES INTO BOTH RELATIONAL ENTITIES AND MACHINE LEARNING MODELS THAT SUPPORT STRUCTURED QUERY LANGUAGE QUERIES

(71) Applicant: Graft, Inc., San Francisco, CA (US)

(72) Inventors: Adam Oliner, San Francisco, CA (US); Maria Kazandjieva, Menlo Park, CA (US); Eric Schkufza, Oakland, CA (US); Mher Hakobyan, Mountain View, CA (US); Irina Calciu, Palo Alto, CA (US); Brian Calvert, San Francisco, CA (US)

(73) Assignee: Graft, Inc., San Francisco, CA (US)

( * ) Notice: Subject to any disclaimer, the term of this patent is extended or adjusted under 35 U.S.C. 154(b) by 134 days.

(21) Appl. No.: 17/488,043

(22) Filed: Sep. 28, 2021

(65) Prior Publication Data
US 2023/0072311 A1    Mar. 9, 2023

Related U.S. Application Data

(60) Provisional application No. 63/216,431, filed on Jun. 29, 2021.

(51) Int. Cl.
*G06F 16/242* (2019.01)
*G06F 16/2458* (2019.01)
(Continued)

(52) U.S. Cl.
CPC ...... *G06F 16/2448* (2019.01); *G06F 16/2458* (2019.01); *G06F 16/285* (2019.01); *G06F 16/3332* (2019.01); *G06N 20/20* (2019.01)

(58) Field of Classification Search
None
See application file for complete search history.

(56) References Cited

U.S. PATENT DOCUMENTS

| 7,039,654 B1 | 5/2006 | Eder |
| 10,310,896 B1 | 6/2019 | Kichak et al. |

(Continued)

FOREIGN PATENT DOCUMENTS

| CN | 103914513 B | 2/2018 |
| CN | 111552855 A | 8/2020 |
| WO | WO-2014132349 A1 | 9/2014 |

OTHER PUBLICATIONS

Derakhshan, et al., Optimizing Machine Learning Workloads in Collaborative Environments, SIGMOD, Jun. 14-19, 2020, pp. 1701-1716.

(Continued)

*Primary Examiner* — Amresh Singh
(74) *Attorney, Agent, or Firm* — Cooley LLP

(57) ABSTRACT

A non-transitory computer readable storage medium has instructions executed by a processor to receive from a network connection different sources of unstructured data. An entity is formed by combining one or more sources of the unstructured data, where the entity has relational data attributes. A representation for the entity is created, where the representation includes embeddings that are numeric vectors computed using machine learning embedding models, including trunk models, where a trunk model is a machine learning model trained on data in a self-supervised manner. An enrichment model is created to predict a property of the entity. A query is processed to produce a query result, where the query is applied to one or more of the entity, the embeddings, the machine learning embedding models, and the enrichment model.

21 Claims, 3 Drawing Sheets

(51) Int. Cl.
*G06F 16/28* (2019.01)
*G06F 16/33* (2019.01)
*G06N 20/20* (2019.01)

(56) References Cited

U.S. PATENT DOCUMENTS

| | | |
|---|---|---|
| 10,775,976 B1 | 9/2020 | Abdul-Jawad et al. |
| 2006/0242190 A1 | 10/2006 | Wnek |
| 2015/0074081 A1 | 3/2015 | Falter et al. |
| 2016/0092551 A1 | 3/2016 | Tang et al. |
| 2017/0212924 A1 | 7/2017 | Semlani et al. |
| 2018/0191764 A1* | 7/2018 | Chawla ................ G06F 16/951 |
| 2020/0057946 A1 | 2/2020 | Singaraju et al. |
| 2020/0073518 A1 | 3/2020 | Boucher et al. |
| 2020/0250328 A1 | 8/2020 | Swenson et al. |
| 2020/0364253 A1 | 11/2020 | Mugan et al. |
| 2021/0072964 A1 | 3/2021 | Bequet et al. |

OTHER PUBLICATIONS

International Search Report and Written Opinion for PCT/US2022/033620, dated Oct. 28, 2022, 9 pages.
International Search Report and Written Opinion for PCT/US2022/033630, dated Oct. 27, 2022, 12 pages.
International Search Report and Written Opinion for PCT/US2022/033638, dated Oct. 27, 2022, 13 pages.
International Search Report and Written Opinion for PCT/US2022/035576, dated Nov. 4, 2022, 14 pages.

* cited by examiner

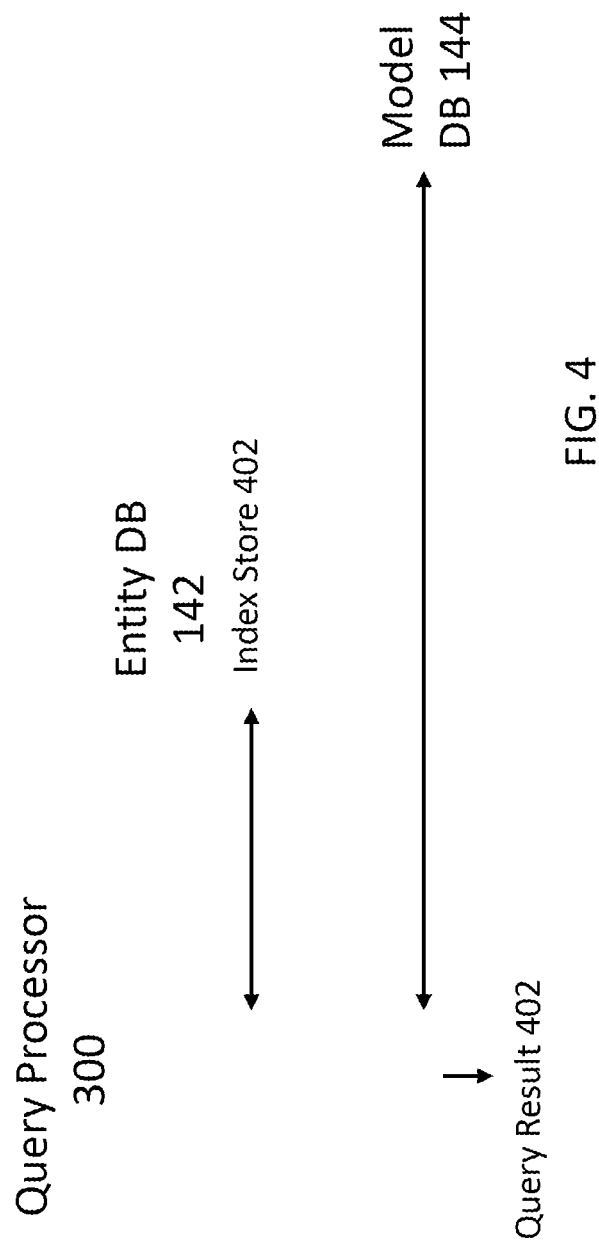

APPARATUS AND METHOD FOR TRANSFORMING UNSTRUCTURED DATA SOURCES INTO BOTH RELATIONAL ENTITIES AND MACHINE LEARNING MODELS THAT SUPPORT STRUCTURED QUERY LANGUAGE QUERIES

CROSS-REFERENCE TO RELATED APPLICATIONS

This application claims priority to U.S. Provisional Patent Application Ser. No. 63/216,431, filed Jun. 29, 2021, the contents of which are incorporated herein by reference.

This application is commonly owned with related patent applications Ser. No. 17/678,942, filed Feb. 23, 2022, Ser. No. 17/735,994, filed May 3, 2022, and Ser. No. 17/853,673, filed Jun. 29, 2022.

FIELD OF THE INVENTION

This invention relates generally to the processing of unstructured data. More particularly, this invention is related to techniques for resolving Structured Query Language (SQL) queries against processed unstructured data.

BACKGROUND OF THE INVENTION

Most of the world's data (80-90%) is Natural Data™: images, video, audio, text, and graphs. While often called unstructured data, most of these data types are intrinsically structured. In fact, the state-of-the-art method for working with such data is to use a large, self-supervised trunk model—a deep neural network that has learned this intrinsic structure—to compute embeddings—a dense numeric vector—for the natural data and use those as the representation for downstream tasks, in place of the Natural Data.

Unlike structured data, where rules, heuristics, or simple machine learning models are often sufficient, extracting value from Natural Data requires deep learning. However, this approach remains out of reach for almost every business. There are several reasons for this. First, hiring machine learning (ML) and data engineering talent is difficult and expensive. Second, even if a company manages to hire such engineers, devoting them to building, managing, and maintaining the required infrastructure is expensive and time-consuming. Third, unless an effort is made to optimize, the infrastructure costs may be prohibitive. Fourth, most companies do not have sufficient data to train these models from scratch but do have plenty of data to train good enrichments.

If you imagine the spectrum of data-value extraction, with 0 being "doing nothing" and 1 being "we've done everything," then the goal of the disclosed technology is to make going from 0 to 0.8 incredibly easy and going from 0.8 to 1 possible.

The objective of the disclosed technology is for any enterprise in possession of Natural Data—even without ML/data talent or infrastructure—to get value out of that data. An average engineer should be able to use the disclosed techniques to deploy production use cases leveraging Natural Data; an average SQL user should be able to execute analytical queries on Natural Data, alongside structured data.

SUMMARY OF THE INVENTION

A non-transitory computer readable storage medium has instructions executed by a processor to receive from a network connection different sources of unstructured data. An entity is formed by combining one or more sources of the unstructured data, where the entity has relational data attributes. A representation for the entity is created, where the representation includes embeddings that are numeric vectors computed using machine learning embedding models, including trunk models, where a trunk model is a machine learning model trained on data in a self-supervised manner. An enrichment model is created to predict a property of the entity. A query is processed to produce a query result, where the query is applied to one or more of the entity, the embeddings, the machine learning embedding models, and the enrichment model.

BRIEF DESCRIPTION OF THE FIGURES

The invention is more fully appreciated in connection with the following detailed description taken in conjunction with the accompanying drawings, in which:

FIG. 4 illustrates query processing performed in accordance with an embodiment of the invention.

Like reference numerals refer to corresponding parts throughout the several views of the drawings.

DETAILED DESCRIPTION OF THE INVENTION

Figure 1:
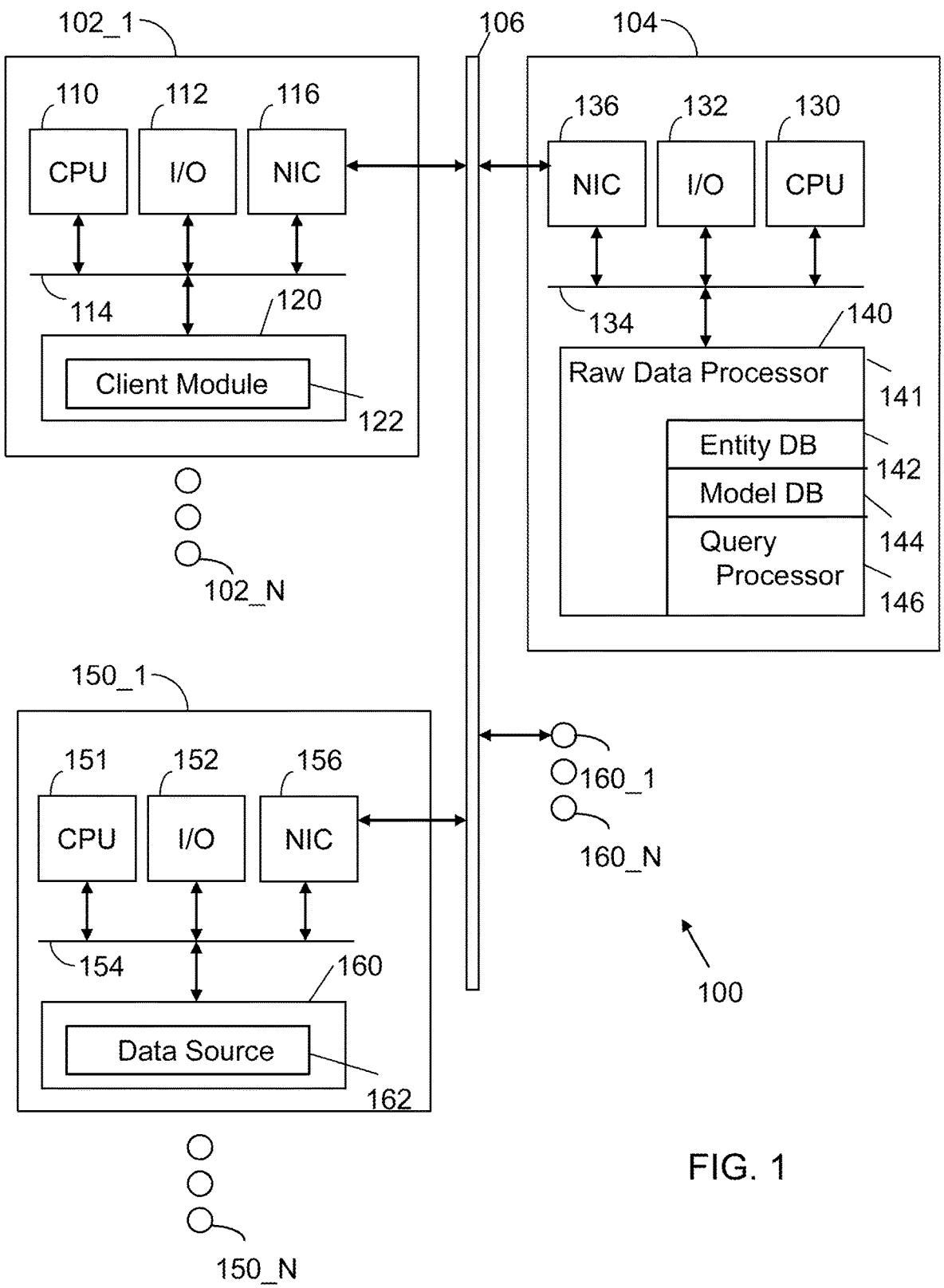
FIG. 1 illustrates a system configured in accordance with an embodiment of the invention.

FIG. 1 illustrates a system 100 configured in accordance with an embodiment of the invention. The system 100 includes a set of client devices 102_1 through 102_N that communicate with a server 104 via a network 106, which may be any combination of wired and wireless networks. Each client device includes a processor (e.g., central processing unit) 110 and input/output devices 112 connected via a bus 114. The input/output devices 112 may include a keyboard, mouse, touch display and the like. A network interface circuit 116 is also connected to the bus 114. The network interface circuit 116 provides connectivity to network 106. A memory 120 is also connected to the bus 114. The memory 120 stores instructions executed by processor 110. The memory 120 may store a client module 122, which is an application that allows a user to communicate with server 104 and data sources 150_1 through 150_N. At the direction of the client module 122, the server 104 collects, stores, manages, analyzes, evaluates, indexes, monitors, learns from, visualizes, and transmits information to the client module 122 based upon data collected from unstructured data in images, video, audio, text, and graphs originally resident on data sources 150_1 through 150_N.

Server 104 includes a processor 130, input/output devices 132, a bus 134 and a network interface circuit 136. A memory 140 is connected to the bus 134. The memory 140 stores a raw data processor 141 with instructions executed by processor 136 to implement the operations disclosed herein. In one embodiment, the raw data processor 141 includes an entity database 142, a model database 144 and a query processor 146, which are described in detail below.

System 100 also includes data source machines 150_1 through 150_N. Each data source machine includes a processor 151, input/output devices 152, a bus 154 and a network interface circuit 156. A memory 160 is connected to bus 154. The memory stores a data source 162 with unstructured data.

The entity database 142 provides persistent storage for entities, labels, enrichment predictions, and entity metadata such as when an enrichment prediction was last made. The model database 144 provides persistent storage for trunks, combinators, enrichments, and metadata such as which user owns which model, when a model was last trained, etc.). The query processor 146 is a runtime process that enforces consistency between the entity and model databases, and provides UI access to both via a network connection. It also supports queries against entities, embeddings, machine learning embedding models and enrichment models, as detailed below. Each of these components may be implemented as one or more services.

The following terms are used in this disclosure:

Raw Data: Unstructured data, such as images, video, audio, text, and graphs in a native (non-augmented) form at the time of system ingestion.

Data Source: A user-specified mechanism for providing data to be processed. Examples include SQL tables, JSON or CSV files, S3 buckets and the like. FIG. 1 shows data sources 150_1 through 150_N.

Connector: A persistent service which pulls new data from a specified Data Source at regular intervals.

Entity: a time-varying aggregation of one or more pieces of data. For example, a user might define a "Product" entity that describes a commercial product to be all the images and videos associated with the product, a text description, user reviews, and some tabular values like price. As images or reviews are added or modified, the representation of that entity within the system also changes.

Primitive Entity: An entity defined in terms of a single piece of Raw Data. For example, an image or a single product review.

Higher Order Entity: An entity which is defined by combining multiple entities together. For example, the previously mentioned Product entity comprises image entities as well as text entities.

Embedding Model: A machine learning model that produces an embedding. This can be either a trunk model or combinator. Embedding models are applied to raw data or other embeddings to generate numeric vectors that represent the entity.

Trunk Model: A machine learning model that has been trained in a self-supervised manner to learn the internal structure of raw data. A trunk model takes raw data or as input and outputs an embedding, which is a numeric vector.

Combinator: A machine learned model or a process for combining the embeddings from multiple models into a single embedding. This is the mechanism through which the representations of multiple entities can be put together to form the representation of a higher order entity.

Embedding Index: A data structure which supports fast lookup of embeddings and k nearest neighbor searches (e.g., given an embedding, find the k closest embeddings in the index).

Enrichment: Refers either to a property inferred from an embedding or the model that performed that inference. For example, text could be enriched by a sentiment score.

Figure 2:
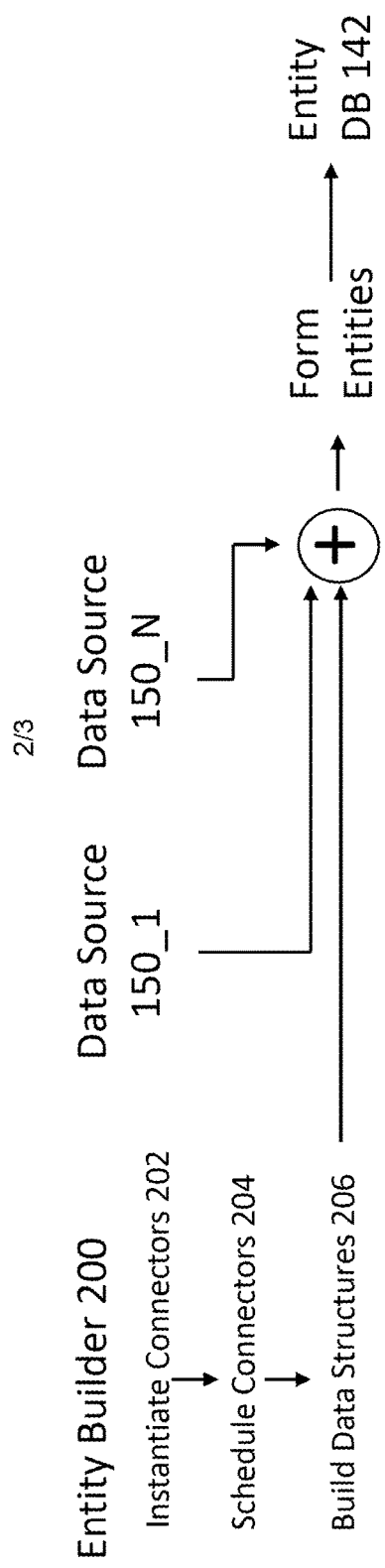
FIG. 2 illustrates processing to form an entity database in accordance with an embodiment of the invention.

FIG. 2 illustrates the process to form the entity database 142. The raw data processor 141 includes an entity builder 200 with instructions executed by processor 130. The entity builder 200 instantiates connectors 202. That is, the user at client machine 102_1 logs into the raw data processor 141. If this is the first time, a unique username is created for the user. This information, along with metadata for the user account is stored in memory 140. A connection manager allocates storage space for connectors and schedules the times that the connectors are operative 204. The Entity Builder 200 allocates storage space for entities in the Entities database 142.

The entity builder 200 then builds data structures 206. In particular, the user clones or forks a model from a default user or another user who provides public models, such as in data sources 150_1 and 150_N. This makes these models available for use by the user. Storage for these models is allocated in a Model Database 144. Cloning and forking have different semantics (see below). A cloned model does not track the changes made by the user the model was cloned from. A forked model does. We note that when cloning or forking a model, it is not necessary to actually copy any bits. It only becomes necessary to do so for a forked model when a change is made to the model.

The user defines one or more connectors which point to their data (instantiate connectors 202). This data could be multi-modal and reside in very different data stores (e.g., an S3 bucket versus a SQL table). A Data Source is an abstract representation of a pointer to a user's data. Data Sources can contain user login credentials, as well as metadata describing the data (e.g., the separator token for a csv file). Once the user has configured a Data Source, that Data Source can be used to create a Connector.

In the processing of forming the entity database 142, the user forms one or more entities. An entity represents a collection of data from one or more Data Sources (e.g., Data Sources 150_1 and 150_N in FIG. 2). For example, a user might have a collection of photos in S3 and a collection of captions for those photos in a MySQL database. The entity representing a captioned photo would combine data from both of those data sources, as shown with the "+" operation in FIG. 2.

A user defines an entity by selecting Data Sources and describing the primary/foreign key relationships that link those data. The primary/foreign key relationships between these data sources implicitly define a table which contains a single row with data from each of its constituent Data Sources for each concrete instance of the entity. These relationships are defined by the build data structures operation 206 performed by the entity builder 200. Consequently, the entity has relational data attributes.

The Entity Builder 200 takes this description and uses it to instantiate Connectors 202 from the appropriate Data Sources (e.g., 150_1 and 150_N). The Entity Builder 200 also uses that description to create a table in the Entity database 142 (an explicit instantiation of the implicit concept described above). Rows in this table will hold all relevant entity data from the user's Data Sources and also system-generated metadata. Once the table has been created, the Connectors are handed off to a Connection Manager which schedules connectors 204 to periodically wake up. Once awake, the Connectors pick up changes or additions to the user's data.

The process of building data structures 206 involves the user defining one or more embeddings for each of their entities. This involves choosing a pretrained trunk model from the user's Model Database 144 or having the system select a model for them.

Figure 3:
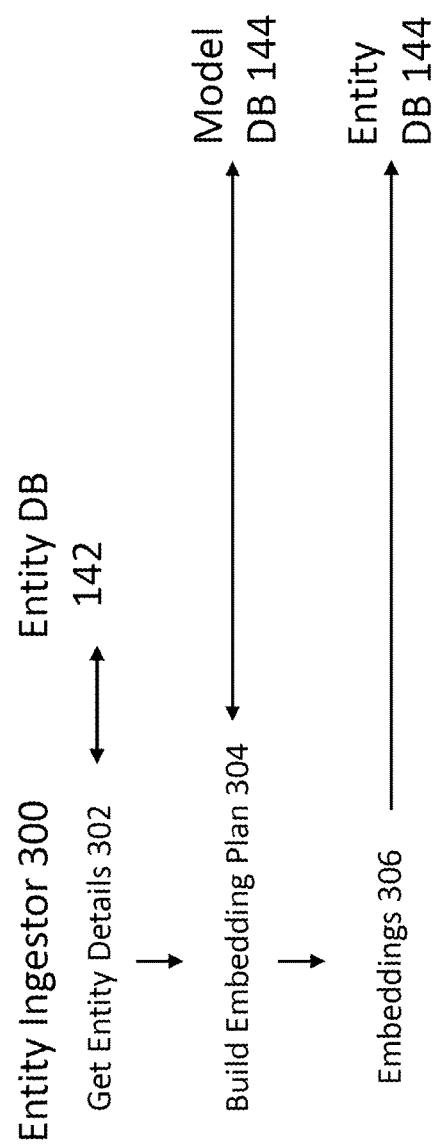
FIG. 3 illustrates processing to form embeddings in accordance with an embodiment of the invention.

After the user or system selects a model, an Entity Ingestor 300 is invoked. The raw data processor 141 includes an Entity Ingestor 300 with instructions executed by processor 130. As shown in FIG. 3, the Entity Ingestor 130 gets entity details 302 from the entity database 142. In particular, the Entity Ingestor 130 is used to extract rows from the user's tables in the user's Entity Database 142. Those rows and the model choice are then passed to an Embedding Service, which builds an embedding plan 304 with reference to the model database 144. The Embedding Service uses a cluster of compute nodes (e.g., 160_1 through 160_N in FIG. 1) which pass the values from each row to the model and produce an embedding. The embeddings are then inserted into an Index Store associated with the Entity Database 144, and an opaque identifier is returned to the Entity Ingestor 300. The Entity Ingestor 300 then stores that identifier, along with metadata such as when the embedding was last computed in the Entity Database 142.

The user can optionally enable continuous pre-training for trunk models. This uses the data in the Entity Database 142 as inputs to an unsupervised training procedure. The flow for this process is identical to that of enrichment training.

The user may at any point query the contents of the tables that they own in the Entity Database 142. This is done using a standard SQL client and standard SQL commands. The disclosed system provides SQL extensions for transforming the opaque identifier produced by the Embedding Service into the value it points to in the Index Store. These SQL extensions simply perform a query against the Index Store. FIG. 4 illustrates query processor 300 accessing Index Store 402 and the model database 144 to produce a query result 402.

The disclosed technology uses SQL extensions that allow the user to perform similarity queries. These are implemented using k-nearest-neighbor search. A SQL query which asks whether two entities are similar would be transformed into one which gets the opaque embedding identifier for those entities from the Entity Database 142 and then submits them to the Index Store 402. The Index Store 402 uses an implementation of K-nearest-neighbor search to determine whether the embeddings are within K neighbors of each other.

The user defines combinators which generate higher order entities from entities created using trunk models (e.g., an entity which represents a social media user's post history might be defined in terms of entities which define individual posts).

Once the user has defined a combinator, a new table is created in the Entity Database 142 (in the same fashion as described under Defining Entities above), and the Entity Ingestor 300 retrieves the entities from the Entity Database 142 which will be used to generate the higher order entity. The Entity Ingestor 300 extracts the embeddings for those entities (in the same fashion as described under Retrieving Embeddings above), computes a function over them (e.g., averaging the embeddings, concatenating them, or some other function that makes the most semantic sense for the higher order entity) and the new data is inserted into the Entity Database 142.

The user may attach labels to entities. This is done via standard SQL syntax, as described below. Disclosed below are SQL extensions for querying the set of entities for which label data would be most useful from the perspective of training enrichment models.

The user may define one or more enrichment models. An enrichment model is a machine learning model (e.g., multi-layer perceptron, boosted decision tree, etc.) which maps from entity embeddings to known values (such as semantic labels, or a continuously-valued target variable). Thus, an enrichment model predicts a property of an entity based upon associated labels.

Once a model has been defined it must be trained. This is orchestrated via a scheduler. Periodically, the scheduler activates a Fine Tuning Service. The service gets the enrichment model which must be trained from the Model Database 144. It then passes that model along with embeddings and labels it extracts from the Index Store 402 and Entity Database 142 to a Fine Tuning cluster (e.g., 160_1 through 160_N in FIG. 1). The compute nodes on the Fine Tuning cluster do the actual work of training the model. When they have run to completion, the Fine Tuning Service updates the persistent copy of the enrichment model stored in the Model Database 144.

Whenever an enrichment model is created, the raw data processor 141 also registers a prediction plan with a Prediction Scheduler. The prediction scheduler is run periodically. It extracts an enrichment model from the Model Database 144 and passes it along with embeddings it has extracted from the Entity Database 142 to a Prediction cluster (e.g., 160_1 through 160_N in FIG. 1). The nodes in the Prediction cluster do the work of running inference on the models to produce a prediction. That prediction is then stored in the same row of the Entity Database 142 as the entity where the embedding used to generate the prediction is stored. Users may use standard SQL syntax to query predictions from the Entity Database 142.

Alerts based on predictions can be defined using standard SQL syntax. The user simply defines triggers based on the conditions they wish to track. Whenever an embedding or prediction which meets these conditions is inserted or updated in the Entity Database 142, the alert will fire.

SQL is typically used with relational (tabular) data. In such data, each column represents a type of value with some semantics. For example, a Name column would contain text representing a user's first name, middle initial, and last name.

To work with unstructured data, specifically Raw Data augmented with embeddings, we require a few necessary SQL extensions, mostly related to administration, entities, similarity, and time:

Administration: All tasks related to the administration of the raw data processor 141 should be executable via SQL commands.

Entities: Users should be able to define and manage entities via SQL. These entities can be multi-modal and may vary over time.

Similarity: Expressing the similarity of two entities in base SQL using anything other than regular expressions requires some gymnastics. We extend the language to support more sophisticated comparisons between entities, corresponding to their distance(s) in one or more embedding spaces.

Time: Entity embeddings change over time. Users should be able to query against windowed versions of data. This requires index support for time-varying embeddings.

The remainder of this disclosure describes these extensions. The SQL extensions are identified in code examples by a "Graft" prefix (e.g., Graft.SIMILAR). (Graft, Inc. is the assignee of the present invention.) All other SQL is standard.

In SQL, the user (e.g., operating client machine 102_1) would load Graft's SQL extensions into their workspace and connect to the raw data processor 141 using the following command.

```
>>>SELECT    Graft.SETUP("username",    <host>,
    <port>);
```
In both cases, if a user named "username" does not currently exist, it is created by the raw data processor 141. <host> and <port> are the endpoint for a Service implemented by the raw data processor 141. If they are not provided, the raw data processor 141 will attempt to automatically discover a public Service. This method returns a numeric code indicating success or the reason for failure.

To obtain a trunk model, the raw data processor 141 comes with a default user ("graft"), which owns a set of pre-trained trunk models (e.g., a ResNet image model, or a BERT transformer model). To use these models, the user must either "fork" or "clone" them into their workspace. Models are named using hierarchical namespaces. Every model owned by the raw data processor 141 has the prefix 'graft.'

```
>>> SELECT Graft.FORK_MODEL(<model>, Graft.PRIVATE);
>>> SELECT Graft.CLONE_MODEL(<model>, Graft.PUBLIC);
```

When a user forks or clones a model, they have the option of making that model publicly visible. A model which is made public can be forked or cloned by another user connected to the raw data processor 141. For example, Google® may wish to clone the BERT model provided by the default system user, train it further, and then make that trunk model publicly available to other users. By default, models that are forked or cloned are private.

Cloning or forking a model recursively clones or forks all of the models that are inputs to that model. These methods return a numeric code indicating success or the reason for failure.

Connectors were discussed in connection with FIG. 2. To begin constructing entities a user must first point the raw data processor 141 to their data. This is done using the CREATE_CONNECTOR command (corresponding to Instantiate Connectors 202 in FIG. 2).

```
>>> SELECT Graft.CREATE_CONNECTOR(<connector type>, <connector args>,
<name>, PRIMARY KEY <pk>, FOREIGN KEY <fk> REFERENCES <connector.pk>);
```

The CREATE_CONNECTOR command is designed to appear similar to SQL's native CREATE TABLE statement. <connector type> and <connector args> are target-specific values, but the remaining syntax is identical to that of CREATE TABLE. We do not describe these in detail, but provide a few examples for clarity:

- <connector type> may describe a SQL table in the user's database. In this case <connector args> would be login credentials that the raw data processor 141 would need to access that data at a regular cadence.
- <connector type> might be the path to a CSV file on the user's machine. In this case, <connector args> would provide metadata such as value and line separator.

In all cases, the user must identify the <name> of the connector and its primary key. Additionally, if the user intends to use this connector in conjunction with other connectors to define an entity the user must also specify any foreign key relationships to those connectors. This method returns a numeric code indicating success or the reason for failure.

Once the user has created a connector, the raw data processor 141 will use <connector args> to periodically contact the data source (e.g., one or more of machines 150_1 through 150_N). To do this, the raw data processor 141 persists <connector args> in permanent storage so that it may reconnect to the Data Source at a later time without additional user input.

The user may observe the values which have so far been ingested by a connector using the standard SELECT syntax:
```
>>>SELECT*FROM <name>;
```
Depending on the cadence at which the connector contacts the underlying data source, the result of this command may be out of sync with the user's ground truth data. The user can change the cadence at which a connector is run by typing the following command. This method returns a numeric code indicating success or the reason for failure.
```
>>>SELECT       Graft.UPDATE_CONNECTOR_CA-
    DENCE(<name>);
```

FIG. 2 disclosed a process for defining entities. In terms of raw data, an entity is essentially a view on top of the connectors that the user has previously defined. Given the strong similarity to the native CREATE VIEW statement, we define the CREATE_ENTITY function analogously. This method uses the PRIMARY and FOREIGN KEY relationships defined by connectors to produce a view table which consists of a single row for all of the data required to describe an entity.

```
>>> SELECT Graft.CREATE_ENTITY(<name, <connector 1>.<col>, <connector 2>.<col>,
... , PRIMARY KEY <connector x>.<col>);
```

Unlike the native CREATE VIEW statement, the PRIMARY KEY annotation is required. As with Connectors, the user can observe Graft's view of their data at any time by typing:
```
>>>SELECT*FROM <entity_name>;
```
In addition to the fields provided by each connector, this command will also display some columns which the raw data processor 141 has defined automatically (e.g., entity_id, a unique id identifying the entity described by each row).

Embeddings were discussed in connection with FIG. 3. Once the user has forked or cloned a trunk model, and defined an entity, the user can start generating embeddings. This is done using the syntax shown below. This method returns a numeric code indicating success or the reason for failure.

```
>>>        SELECT Graft.CREATE_EMBEDDING(
>>>            <entity>,
>>>            <embedding name>,
>>>            <model>,
>>>            <embedding input>
>>>        );
```

The CREATE_EMBEDDING command attaches a new column named <embedding name> to the table named <entity> which was created using the CREATE_ENTITY command. The raw data processor 141 automatically uses <model> to populate this column with embeddings formed by applying <model> to the value which appears in the column named <embedding input> and updates those embeddings whenever the underlying data changes.

The value of entries in the entity column is an opaque identifier. Various methods (described below) can make use of this identifier.

A user may wish to embed the same data using different trunk models. For example, text data could be embedded using a BERT model, or a T5 model. To do so the user simply invokes the CREATE_EMBEDDING method again with new values. This creates an additional column in the entity table for representing these new embeddings which the raw data processor 141 will maintain in parallel to the first.

Choosing the best trunk model for embedding a dataset can require domain specific expertise. Rather than providing the name of a model, the user may instead provide one of a number of pre-defined strategies for automatic model selection as a value for <model> in a call to CREATE_EMBEDDING. Examples include:

Graft.MAX_ENTROPY: Chooses a trunk model which maximizes the entropy of embeddings.

Graft.MAX_CLUSTERS: Chooses a trunk model which maximizes the number of clusters in the resulting embedding space.

The deep learning literature refers to the process of training a trunk model as pre-training. We use the term to refer to not only the process of generating a trunk model to begin with, but any subsequent continuous training for that trunk model. Whenever the user defines an entity, they also have the option to configure continuous pre-training for trunk models. To do so, the user invokes the following command. This method returns a numeric value which indicates success or the reason for failure.

>>>SELECT Graft.PRETRAIN(<trunk>, <entity>, <embedding data>);

This uses the values in the <embedding data> column of the <entity> table to pre-train <trunk> and also schedules pre-training for all trunk models which were forked from this model. In turn, those pre-trainings may schedule additional pre-trainings. Keep in mind that if a model was defined as public, then any information stored in that model as a result of fine-tuning of potentially private data will be exposed as well.

The raw data processor 141 keeps track of when trunk models are fine-tuned and attaches an internal version number. This version number can be used to query the time of the most recent training.

```
>>>    SELECT Graft.GET_TRUNK_CREATED(<trunk>),
>>>           Graft.GET_TRUNK_VERSION(<trunk>),
>>>           Graft.GET_TRUNK_TRAINED(<trunk>);
```

The user can also query for metadata related to training such as the next scheduled round of pre-training:

>>>SELECT Graft.GET_NEXT_PRETRAIN(<trunk>);

A user can query the raw data processor 141 for raw embedding data using the opaque identifier created by a call to CREATE_EMBEDDING. This can be useful if the user has some application the requires the use of raw embedding data or wants to verify the correctness of embeddings.

>>>SELECT Graft.GET_EMBEDDING(<entity>, <embedding_col>);

The raw data processor 141 also attaches metadata to entity tables indicating when entities were created, last trained, and what their version number is. These can be queried using the standard SQL syntax:

```
>>> SELECT <embedding_col>_created, <embedding_col>_version,
        <embedding_col>_trained
>>> FROM <entity>;
```

Recall that the Entity Database 142 contains not only data which were used to create embeddings, but also data which the user felt was important to ingest. This means that the user can form complex queries against the Entity Database 142 (see Real World Examples below) which also reference this non-embedded data (e.g., the user might search for all entities whose embeddings satisfy a certain property and then filter for other properties of that entity).

A user can use embeddings to test for similarity. Internally, this is implemented as K-Nearest Neighbor (KNN) search. Similarity checks can appear wherever a Boolean expression is expected. Graft.SIMILAR returns true whenever the second and third arguments are within each other's <k> nearest neighbors. For example:

```
>>>    SELECT <val> FROM <entity>
>>>       WHERE Graft.SIMILAR(
>>>           <k>,
>>>           SELECT <embedding_col> FROM <entity> WHERE ...
>>>           <embedding_col>
>>>       );
```

Importantly, this is only well-defined when the second and third operands to Graft.SIMILAR appear in the same entity table. Embeddings from two different entities are not comparable.

In some instances the user may prefer to perform ad-hoc search for entities similar to ones which are provided at runtime and should not be stored permanently in an index (say to support semantic search where text should be used as a query and then discarded). The example below is identical to the one above, with the exception that one argument is presented as raw data.

```
>>>    SELECT <val> FROM <entity>
>>>       WHERE Graft.ADHOC_SIMILAR(
>>>           <k>,
>>>           <raw_data>,
>>>           <embedding_col>
>>>       );
```

Internally, the raw data processor 141 remembers the <trunk> model used to define <embedding_col> for <entity> and uses that model to embed <raw_data>. The resulting embedding is then substituted in place of the raw data as in a call to Graft.SIMILAR.

A combinator is a machine-learned model, or process which can be used to combine or transform one or more embeddings into a new embedding. Two examples are centroid combinators (which take the average of multiple embeddings and thus define a new entity whose embedding is that average) and concatenator combinators (which append multiple embeddings into a single embedding and thus define a new entity whose embedding is that concatenation). Creating a combinator requires providing a name, a list of entities that will provide inputs to that combinator, and the primary key that is used to join them. These methods return numeric results that indicate success or describe the reason for failure.

```
>>>    SELECT Graft.CREATE_CENTROID_COMBINATOR(
>>>       <name>,
>>>          <entity1>.<embedding_col>, <entity2>.<embedding_col>, ...
>>>          <pk1>, <pk2>,...
>>>       Graft.PUBLIC
>>>    );
>>>    SELECT Graft.CREATE_CONCAT_COMBINATOR(
>>>       <name>,
>>>          <entity1>.<embedding_col>, <entity2>.<embedding_col>, ...
>>>          <pk1>, <pk2>,...
>>>       Graft.PRIVATE
>>>    );
```

As with trunk models, combinators are made private by default. The user can override this behavior as necessary. Once a combinator model has been created the raw data processor 141 will do all the work of computing updates to that model whenever its input dependencies (e.g., the embeddings for one of its input entities) changes.

Conceptually, combinators describe higher order entities. As a result, they are represented to the user in exactly the same fashion as primitive entities. By typing
>>>SELECT*FROM <combinator>;
The user would see a table with columns from each of the input entities, a system-generated column named embedding, and the same types of metadata columns described above for entities created with trunk models.

Often a user will want to attach labels to an entity for the purpose of defining and validating enrichments. This is done by using the CREATE_LABEL command. This creates a new column on an entity's data table which by default contains only null values. This method returns a numeric value which indicates success or describes the reason for failure.
>>>SELECT     Graft.CREATE_LABEL(<entity>, <name>);
Once a user has created this column, they may insert values into it using the standard SQL syntax:
>>>UPDATE <entity>SET <label>=<value>;
Alternatively, a user may have a pre-existing set of labels which she wishes to provide via a connector. So long as the connector shares the same primary key as was used to define the entity, the user can instead type:
>>>SELECT    Graft.CREATE_LABEL_FROM_CONNECTOR(<entity>, <connector>);
Not all labels are equally useful from the perspective of training. A label for one row may provide much more useful information than the label for another row. The raw data processor 141 can provide hints to the user as to which labels are best worth his effort to generate by using the following syntax:
>>>SELECT   graft_id   FROM   <entity>WHERE Graft.LABEL_SUGGESTED( );
This will return the list of graft_id's associated with the rows in the table which could most benefit from a user-supplied label. The raw data processor 141 can use one of many strategies for generating this set, such as active learning techniques or domain-specific heuristics. Examples include, but are not limited to, the following:
Unlabeled examples close to cluster centroids in the embedding space;
Unlabeled examples close to decision boundaries, as determined by one or more classification algorithms;
Unlabeled examples far from centroids or decision boundaries in the embedding space;
Misclassified examples, as determined by known 'correct' labels or by downstream consequences of incorrect predictions;
Properties of unlabeled examples, such as properties predicted by enrichment models (e.g., any image examples predicted to be 'blurry' by an enrichment model);
The results returned by another SQL query (e.g., customers with accounts younger than six months); or
Any combination of the above.

An enrichment model is a machine learning model (e.g., multi-layer perceptron) that is defined in terms of entity embeddings and labels. For example, a user might wish to train a sentiment analyzer based on labeled text. She would do this by defining an enrichment model in terms of the embeddings for an entity that represents that text. Note that enrichment models can only be defined in terms of a single embedding, but combinators can be used to produce higher order entities with arbitrarily complex embeddings. This method returns a numeric result that indicates success or describes the reason for failure.

```
>>>    SELECT Graft.CREATE_ENRICHMENT(
>>>       <name>,
>>>       <entity>,
>>>       <label_col>,
>>>       <embedding_col>
>>>    )
```

Creating an enrichment adds another column to the user's entity table named <name>. In order to train the model, the raw data processor 141 uses all rows that have a non-null value for <label_col> (i.e., the user has provided a label).

As with combinators and trunk models, enrichment models are private by default, but an optional argument can override the behavior. Public enrichment models can be used by anyone who has created a trunk-model based entity that uses the same model and input data type as the entity that was used to define that enrichment. Similarly, combinator-based enrichments can be used by anyone whose entities can be decomposed into the same set of trunk-based entities with embeddings generated using the same models as the ones used by the entities that were used to define the enrichment.

The deep learning literature refers to the process of using labeled data to create an enrichment model as fine-tuning. Once the user has uploaded labeled data, he can invoke the fine-tuning process as follows. When any of the upstream dependencies for an enrichment model are changed (say a trunk model is fine-tuned with some new set of training data and all of its entity embeddings are updated, or the creation of a new entity changes the value of a centroid entity) an invocation of the finetune or FINETUNE method is automatically scheduled for that model. The user can schedule this training explicitly by typing the following. This method returns a numeric value indicating success or describing the reason for failure.
>>>SELECT Graft.FINETUNE(<enrichment>);
As with trunk models, the user can query for metadata related to enrichment models:

```
>>>    SELECT Graft.GET_ENRICHMENT_CREATED(<model>),
>>>       Graft.GET_ENRICHMENT_VERSION(<model>),
>>>       Graft.GET_ENRICHMENT_TRAINED(<model>),
>>>       Graft.GET_NEXT_FINETUNE(<model>);
```

Once an enrichment has been created, the raw data processor 141 will automatically populate the NULL values of the column created by the call to CREATE_LABEL. The user can use these predictions to power their own applications or to craft SQL-style triggers and constraints based on the values that the raw data processor 141 places in that column.

We close with a collection of worked examples which show off the workflow and API calls described above. First, we discussed connecting to the raw data processor 141. A user named "user" might connect to the raw data processor 141 at a public IP address by typing:

>>>SELECT Graft.SETUP("user", "150.98.116.72", 8888)

Say the user expects to work with text and images. She might clone or fork a ResNet model (for images) and a BERT model (for text). Depending on her application, she may choose to make one model public and the other private.

```
>>> Graft.FORK_MODEL("graft.resnet18", Graft.PRIVATE);
>>> Graft.CLONE_MODEL("graft.bert-base-uncased", Graft.PUBLIC);
```

Say the user is interested in working with captioned photos. He keeps the captions for the photos in an Amazon S3 bucket (where each file in the bucket corresponds to a photo), and he keeps the captions in a SQL database. The database table has two columns: id (INT) and caption (TEXT). The names of the photo files correspond to the id (primary key) column in the database.

The user would create two connectors, one for the S3 bucket, and one for the SQL database.

```
>>>        Graft.CREATE_CONNECTOR(
>>>            Graft.SQL_TABLE,
>>>            "user",
>>>            "password",
>>>            "10.120.43.116", -- database host
>>>            3306, -- database port
>>>            "my_sql_connector",
>>>            PRIMARY KEY id
>>>        );
>>>        Graft.CREATE_CONNECTOR(
>>>            Graft.S3_BUCKET,
>>>            "/path/to/bucket",
>>>            "4jfdsk39fdljkfsdl2", -- AWS secret key
>>>            "my_s3_connector",
>>>            PRIMARY KEY Graft.filename
>>>        );
```

The user could then check the data provided by each connector by typing the following. The data would be formatted as though it were stored in a SQL table.

```
>>> SELECT * FROM user.my_sql_connector; -- returns id/caption tuples
>>> SELECT * FROM user.my_s3_connector; -- returns filename/image uri tuples
```

The user could update the cadence at which the SQL connector is run to every hour by typing:

>>>Graft.UPDATE_CONNECTOR_CADENCE ("user.my_sql_connector", 3600);

Say the user wants to create a single entity for representing captioned photos. She would type:

```
>>>        Graft.CREATE_ENTITY(
>>>            "captioned_photo",
>>>            my_sql_connector.id PRIMARY KEY,
>>>            my_sql_connector.caption,
>>>            my_s3_connector.filename PRIMARY KEY,
>>>            my_s3_connector.image_uri
>>>        );
```

The use of the PRIMARY KEY annotation tells the raw data processor 141 how to link photos in the s3 bucket with captions in the database: images with a given filename correspond to captions with the same id. This results in a row in a table in the Entity Database 142 named "captioned_photo" with columns: graft_id (equal to the value of primary key or filename), caption, image_uri. The user can query this table using standard SQL syntax:

>>>SELECT*FROM captioned_photo; - - - returns triples (id, caption, image_uri)

Depending on the application, the user may want to reason about captioned photos in terms of their image embeddings, caption embeddings, or both. Say the user wants to embed images using ResNet, but does not know a good model for embedding captions. He would type:

```
>>>    Graft.CREATE_EMBEDDING(
>>>        "captioned_photo",
>>>        "image_embedding",
>>>        "user.resnet18",
>>>        "image_uri"
>>>    );
>>>    Graft.CREATE_EMBEDDING(
>>>        "captioned_photo",
>>>        "text_embedding",
>>>        Graft.MAX_ENTROPY, -- tells graft to pick the best model based on this heuristic
>>>        "image_uri"
>>>    );
```

This would add two new columns to the captioned_photo table in the entity database: image_embedding and text_embedding. The raw data processor 141 will automatically update and maintain these columns for the user.

The user can query the captioned_photo entity table using standard syntax, but embeddings are opaque identifiers (e.g., 64-bit integers). In order to retrieve the underlying defined image embeddings, he could type:

>>>SELECT Graft.GET_EMBEDDING(captioned_photo, image_embedding);

He could also query metadata for those embeddings by typing:

```
>>>        SELECT
>>>            image_embedding_created,
>>>            image_embedding_version,
>>>            image_embedding_trained
>>>        FROM captioned_image;
```

Say the user wants to search for images which follow the pattern of a certain offensive meme. He could type the following query:

```
>>>    SELECT image_uri FROM captioned_photos
>>>       WHERE Graft.SIMILAR(
>>>          10, -- the image is within ten nearest neighbors of the
             problematic image
>>>          SELECT image_embedding FROM captioned_photos
             WHERE image_uri = <uri>,
>>>          image_embedding
>>>       );
```

Say the user wants to search for captions which are semantically similar to a problematic phrase. If this phrase does not appear anywhere in the dataset, he can perform an adhoc query as follows:

```
>>>    SELECT caption FROM captioned_photos
>>>       WHERE Graft.SIMILAR(
>>>          10, -- the caption is within ten nearest neighbors of the phrase
>>>          "problematic phrase",
>>>          text_embedding
>>>       );
```

Say the user now wants to create an embedding which is a combination of a posts text and image data. Furthermore, for bookkeeping purposes she would like to associate these embeddings with a new entity (as opposed to just adding another column to captioned_photo). Embeddings for this entity would be the concatenation of the underlying image and text embeddings. Say she decides to call this entity "multi_modal_captioned_photo". She would define a combinator to create this entity as follows:

```
>>>    SELECT Graft.CREATE_CONCAT_COMBINATOR(
>>>       "multi_modal_captioned_photos",
>>>       captioned_photo.image_embedding,
          captioned_photo.text_embedding
>>>       captioned_photo.graft_id, captioned_photo.graft_id,
>>>       Graft.PRIVATE -- the user wishes to keep this entity
          private
>>>    );
```

Say the user also wants to create an entity which represents photos that share the same caption. Embeddings for this entity would be the average of the embeddings for the underlying photos.

```
>>>    SELECT Graft.CREATE_CENTROID_COMBINATOR(
>>>       "photo group,
>>>       captioned_photos.image_embedding, -- aggregate image
          embeddings
>>>       captioned_photos.text, -- use the caption text as primary key
>>>       Graft.PRIVATE -- The user wishes to keep this entity private
          as well
>>>    );
```

The user can query the tables for both new entities by typing:

```
>>> SELECT * FROM multi_modal_captioned_photos;
>>> SELECT * FROM photo_group;
```

Say the user wants to track groups of photos that share the same caption which are problematic. This might, for example, be a way of discovering a meme to filter for. He would create the label by typing the following. This creates a new column in the photo_group entity table.

>>>Graft.CREATE_LABEL("photo_group", "problematic"); The user could then manually attach labels:

>>>UPDATE photo_group SET problematic=1 WHERE caption=<offensive meme>

If the user wanted help selecting entities to label he could type:

>>>SELECT graft_id FROM photo_group WHERE Graft.LABEL_SUGGESTED( );

The user might then create an enrichment model to predict the problematic label on unseen photo groups by typing:

```
>>>    SELECT Graft.CREATE_ENRICHMENT(
>>>       "problematic_enrichment", -- The name to assign the
          enrichment model
>>>       "photo_group", -- The name of the entity
>>>       "problematic", -- The label column to use for training
>>>       "embedding" -- The automatically generated combinator
          embedding name
>>>    )
```

Once the user has defined an enrichment model, the raw data processor 141 will automatically populate all the null values in the photo_group entity's problematic column. The user can query these predictions using standard SQL syntax:

>>>SELECT problematic FROM photo_group;

Anomaly detection can be thought of as the opposite of a KNN similarity search. Say the user wants to find photos that are dissimilar to any that have been posted before. He could define a SQL trigger on the captioned_photo table to alert him when such a photo is posted.

```
>>>    CREATE TRIGGER AnomalousPhoto AFTER UPDATE ON
       captioned_photos
>>>       <action here> -- e.g. send an email, insert the photo into a
          database, etc.
>>>       SELECT image_uri FROM captioned_photos
>>>          WHERE Graft.DISTANCE(
>>>             Graft.GET_EMBEDDING(captioned_photos,
                image_embedding),
>>>             (SELECT Graft.GET_EMBEDDING("captioned_photos,
                image_embeding) FROM
       captioned_photos)
>>>          ) > threshold;
```

Embedding statistics can be used to ask questions such as "how are embeddings changing over time?" The following query would return drift in embeddings for photos as the underlying model which generates embeddings changes.

```
>>>    SELECT
>>>       image_embedding_created, image_embedding_version,
>>>       Graft.GET_EMBEDDING(captioned_photos,
          image_embedding)
>>>    FROM captioned_photos
>>>    GROUP BY image_embedding_version;
```

Prediction statistics can be used to ask time-windowed questions such as "how many problematic photo groups have appeared recently?" Assuming a configuration in which problematic predictions were generated on a daily basis, we could formulate this query in SQL as follows:

```
>>>     SELECT COUNT(*)
>>>        FROM photo_groups
>>>        WHERE
>>>           problematic_prediction_created = CURDATE( )
>>>           AND Graft.PREDICT("photo groups", embedding) = 1;
```

The query below asks the question "show me all captioned photos with images like this one and text like that one.

```
>>>     SELECT graft_id FROM captioned_photos WHERE
>>>        Graft.SIMILAR(10, caption,
>>>           SELECT text_embedding FROM captioned_photos
>>>           WHERE graft_id = <this one>),
>>>           text_embedding
>>>     )
>>>     INTERSECT
>>>     SELECT graft_id FROM captioned_photos WHERE
>>>        Graft.SIMILAR(10, image,
>>>           SELECT image_embedding FROM captioned_photos
>>>           WHERE graft_id = <that one>),
>>>           image_embedding
>>>     );
```

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   receive from a network connection different sources of unstructured data;
   form an entity combining one or more sources of the unstructured data, wherein the entity has relational data attributes;
   create a representation for the entity, wherein the representation includes embeddings that are numeric vectors computed using machine learning embedding models, including trunk models, where a trunk model is a machine learning model trained on data in a self-supervised manner;
   create an enrichment model to predict a property of the entity; and
   process a query to produce a query result, wherein the query is applied to one or more of the entity, the embeddings, the machine learning embedding models, and the enrichment model, wherein Structured Query Language (SQL) extensions are supplied to facilitate the operation to process the query to produce the query result, wherein the SQL extensions include SQL extensions to query against time-windowed versions of data.

2. The non-transitory computer readable storage medium of claim 1 wherein the SQL extensions include SQL extensions for the administration of the entity, the embeddings, the machine learning embedding models, and the enrichment model.

3. The non-transitory computer readable storage medium of claim 1 wherein the SQL extensions include SQL extensions to compare different time-windowed versions of data for anomaly detection.

4. The non-transitory computer readable storage medium of claim 1 wherein the SQL extensions include SQL extensions to detect gradual changes over time in one or more of the data, the entity, the embeddings, the machine learning embedding models, and the enrichment model.

5. The non-transitory computer readable storage medium of claim 1 further comprising instructions executed by the processor to combine embeddings into a single combined embedding, as defined by a combinator.

6. The non-transitory computer readable storage medium of claim 5 further comprising instructions executed by the processor to combine embeddings based upon a centroid function.

7. The non-transitory computer readable storage medium of claim 5 further comprising instructions executed by the processor to combine embeddings based upon a concatenation function.

8. The non-transitory computer readable storage medium of claim 5 further comprising instructions executed by the processor to combine embeddings by training a new embedding model used to generate a combined embedding.

9. The non-transitory computer readable storage medium of claim 1 further comprising instructions executed by the processor to label entities, where a label is a number, a category, or a tuple comprising a plurality of labels.

10. The non-transitory computer readable storage medium of claim 9, wherein standard Structured Query Language (SQL) syntax is used to label entities.

11. The non-transitory computer readable storage medium of claim 9 wherein the label is used in conjunction with the representation of the entity to train a new enrichment model to predict a labeled property for a new entity.

12. The non-transitory computer readable storage medium of claim 11, wherein standard Structured Query Language (SQL) syntax is used to predict the labeled property from the enrichment model.

13. The non-transitory computer readable storage medium of claim 9, wherein standard Structured Query Language (SQL) syntax is used to generate suggested entities to label based on properties of representations of the suggested entities and properties of corresponding enrichment models.

14. The non-transitory computer readable storage medium of claim 13 further comprising instructions executed by the processor to generate entities to label by using properties of embeddings for the entities, including one or more of proximity to a centroid, proximity to a labeled entity, and proximity to an entity for which an incorrect prediction was generated.

15. The non-transitory computer readable storage medium of claim 1 further comprising an embedding index store to facilitate similarity searches over entities.

16. The non-transitory computer readable storage medium of claim 1 further comprising selecting a best trunk model for the data, as measured by one or more of maximizing entropy of the embeddings and performance of downstream queries.

17. The non-transitory computer readable storage medium of claim 1 further comprising selecting the trunk model to produce a target number of clusters in an embedding space.

18. A non-transitory computer readable storage medium with instructions executed by a processor to:
receive from a network connection different sources of unstructured data;
form an entity combining one or more sources of the unstructured data, wherein the entity has relational data attributes;
create a representation for the entity, wherein the representation includes embeddings that are numeric vectors computed using machine learning embedding models, including trunk models, where a trunk model is a machine learning model trained on data in a self-supervised manner;
create an enrichment model to predict a property of the entity; and
process a query to produce a query result, wherein the query is applied to one or more of the entity, the embeddings, the machine learning embedding models, and the enrichment model, wherein Structured Query Language (SQL) extensions are supplied to facilitate the operation to process the query to produce the query result, wherein the SQL extensions include SQL extensions to query specific past values, including a predicted value from the enrichment model using a historical value of an embedding.

19. A non-transitory computer readable storage medium with instructions executed by a processor to:
receive from a network connection different sources of unstructured data;
form an entity combining one or more sources of the unstructured data, wherein the entity has relational data attributes;
create a representation for the entity, wherein the representation includes embeddings that are numeric vectors computed using machine learning embedding models, including trunk models, where a trunk model is a machine learning model trained on data in a self-supervised manner;
create an enrichment model to predict a property of the entity; and
process a query to produce a query result, wherein the query is applied to one or more of the entity, the embeddings, the machine learning embedding models, and the enrichment model, wherein Structured Query Language (SQL) extensions are supplied to facilitate the operation to process the query to produce the query result, wherein the SQL extensions include SQL extensions to perform similarity queries over entities, including one or more of nearest-neighbor searches, K-d trees, product quantization, and locality-sensitive hashing.

20. A non-transitory computer readable storage medium with instructions executed by a processor to:
receive from a network connection different sources of unstructured data;
form an entity combining one or more sources of the unstructured data, wherein the entity has relational data attributes;
create a representation for the entity, wherein the representation includes embeddings that are numeric vectors computed using machine learning embedding models, including trunk models, where a trunk model is a machine learning model trained on data in a self-supervised manner;
create an enrichment model to predict a property of the entity;
process a query to produce a query result, wherein the query is applied to one or more of the entity, the embeddings, the machine learning embedding models, and the enrichment model;
an entity ingestor with instructions executed by the processor to:
generate from entities the representation;
compute a function over the representation to produce new data;
insert the new data into an entity database; and
process standard Structured Query Language (SQL) syntax to derive a prediction from the entity database.

21. The non-transitory computer readable storage medium of claim 20 further comprising using standard SQL to generate an alert based upon the prediction.

\* \* \* \* \*